US012032688B2

(12) United States Patent
Parmar et al.

(10) Patent No.: US 12,032,688 B2
(45) Date of Patent: Jul. 9, 2024

(54) METHOD OF TRAINING A MODULE AND METHOD OF PREVENTING CAPTURE OF AN AI MODULE

(71) Applicants: Robert Bosch GmbH, Stuttgart (DE); Robert Bosch Engineering and Business Solutions Private Limited, Bangalore (IN)

(72) Inventors: Manojkumar Somabhai Parmar, Ahmedabad (IN); Adit Jignesh Shah, Ahmedabad (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 268 days.

(21) Appl. No.: 17/493,625

(22) Filed: Oct. 4, 2021

(65) Prior Publication Data
US 2022/0215092 A1 Jul. 7, 2022

(30) Foreign Application Priority Data
Aug. 6, 2020 (IN) .......................... 2020 4103 3611

(51) Int. Cl.
*G06F 21/55* (2013.01)
(52) U.S. Cl.
CPC ...... *G06F 21/554* (2013.01); *G06F 2221/034* (2013.01)
(58) Field of Classification Search
CPC .................. G06F 21/554; G06F 2221/034
See application file for complete search history.

(56) References Cited

U.S. PATENT DOCUMENTS 11,275,841 B2 * 3/2022 Poliakov ............... G06F 18/241
11,443,069 B2 * 9/2022 Liu ....................... G06F 21/577
(Continued)

FOREIGN PATENT DOCUMENTS

| WO | WO 2019/014487 A1 * | 1/2019 | ............. H04L 29/06 |
| WO | WO 2019/087033 A1 * | 5/2019 | ............. G06N 3/04 |
| WO | WO-2022224246 A1 * | 10/2022 | ............. G06F 21/54 |

OTHER PUBLICATIONS

Talty et al, "A Sensitivity Analysis of Poisoning and Evasion Attacks in Network Intrusion Detection System Machine Learning Models", 2021, MILCOM 2021—Special Session on Internet of Battlefield Things, p. 1011-1016.*
(Continued)

*Primary Examiner* — Christopher A Revak
(74) *Attorney, Agent, or Firm* — Maginot, Moore & Beck LLP

(57) ABSTRACT

An AI system includes an input interface configured to receive input data from at least one user, and a blocker module configured (i) to detect the received input data is an attack input data, (ii) to manipulate output data of the blocker module, and (iii) to send the output data from the blocker module to the at least one user. The AI system further includes an AI module configured to process the input data received by the blocker module and to generate output data corresponding to the input data. The AI system also includes a blocker notification module configured to transmit a notification to the owner of the AI system on detecting an attack input data, and an output interface configured to send the generated output data to the at least one user.

8 Claims, 5 Drawing Sheets

(56) References Cited

U.S. PATENT DOCUMENTS

| | | | |
|---|---|---|---|
| 2019/0095629 A1* | 3/2019 | Lee | G06Q 10/06 |
| 2019/0188562 A1* | 6/2019 | Edwards | G06N 5/045 |
| 2019/0311277 A1* | 10/2019 | Kursun | G06N 3/08 |
| 2020/0005133 A1* | 1/2020 | Zhang | G06F 17/10 |
| 2021/0350004 A1* | 11/2021 | Rahnama-Moghaddam | G06F 21/577 |
| 2022/0156376 A1* | 5/2022 | dos Santos Silva | G06N 5/04 |
| 2023/0038463 A1* | 2/2023 | Takahashi | G06N 3/08 |

OTHER PUBLICATIONS

Tian et al, "Exploring Targeted and Stealthy False Data Injection Attacks via Adversarial Machine Learning", Aug. 1, 2022, IEEE Internet of Things Journal, vol. 9, No. 15, p. 14116-14125.*
Doan et al, "Februus: Input Purification Defense Against Trojan Attacks on Deep Neural Network Systems", Dec. 2020, ACSAC 2020, p. 897-912.*

* cited by examiner

METHOD OF TRAINING A MODULE AND METHOD OF PREVENTING CAPTURE OF AN AI MODULE

This application claims priority under 35 U.S.C. § 119 to patent application no. IN 2020 4103 3611, filed on Aug. 6, 2020 in India, the disclosure of which is incorporated herein by reference in its entirety.

FIELD

The disclosure relates to a method of training a module in an AI system and a method of preventing capture of an AI module in the AI system.

BACKGROUND

Now days, most of the data processing and decision making systems are implemented using artificial intelligence modules. The artificial intelligence modules use different techniques like machine learning, neural networks, deep learning etc.

Most of the AI based systems, receive large amounts of data and process the data to train AI models. Trained AI models generate output based on the use cases requested by the user. Typically the AI systems are used in the fields of computer vision, speech recognition, natural language processing, audio recognition, healthcare, autonomous driving, manufacturing, robotics etc. where they process data to generate required output based on certain rules/intelligence acquired through training.

To process the inputs, the AI systems use various models/algorithms which are trained using the training data. Once the AI system is trained using the training data, the AI systems use the models to analyze the real time data and generate appropriate result. The models may be fine-tuned in real-time based on the results.

The models in the AI systems form the core of the system. Lots of effort, resources (tangible and intangible), and knowledge goes into developing these models.

It is possible that some adversary may try to capture/copy/extract the model from AI systems. The adversary may use different techniques to capture the model from the AI systems. One of the simple techniques used by the adversaries is where the adversary sends different queries to the AI system iteratively, using its own test data. The test data may be designed in a way to extract internal information about the working of the models in the AI system. The adversary uses the generated results to train its own models. By doing these steps iteratively, it is possible to capture the internals of the model and a parallel model can be built using similar logic. This will cause hardships to the original developer of the AI systems. The hardships may be in the form of business disadvantages, loss of confidential information, loss of lead time spent in development, loss of intellectual properties, loss of future revenues etc.

There are methods known in the prior arts to identify such attacks by the adversaries and to protect the models used in the AI system. The prior art US 2019/0095629 A1 discloses one such method.

The method disclosed in above prior art receives the inputs, the input data is processed by applying a trained model to the input data to generate an output vector having values for each of the plurality of pre-defined classes. A query engine modifies the output vector by inserting a query in a function associated with generating the output vector, to thereby generate a modified output vector. The modified output vector is then output. The query engine modifies one or more values to disguise the trained configuration of the trained model logic while maintaining accuracy of classification of the input data.

SUMMARY

According to an exemplary embodiment of the disclosure, an AI system includes an input interface, a block module, an AI module, a block notification module, and an output interface. The input interface is configured to receive input data from at least one user. The blocker module is configured (i) to detect the received input data is an attack input data, (ii) to manipulate output data of the blocker module, and (iii) to send the manipulated output data from the blocker module to the at least one user. The AI module is configured (i) to process the received input data, and (ii) to generate output data corresponding to the processed input data. The blocker notification module is configured to transmit a notification to an owner of the AI system when the attack input data is detected. The output interface is configured to send the generated output data from the AI module to the at least one user.

According to another exemplary embodiment of the disclosure a method of training a module in a blocker module in an AI system includes searching for all available attack input data and valid input data and recording output for all available attack input data. The method further includes recording output for all available valid input data, and providing a distribution of the recorded output for the attack input data and the recorded output for the valid input data.

According to yet another exemplary embodiment of the disclosure, a method to prevent capturing of an AI module in an AI system includes receiving input data from at least one user through an input interface, identifying the input data as attack input data or as valid input data in a blocker module, and processing the input data based on the identification and input from a trained module/module in the blocker module. The method further includes sending through the blocker module to the at least one user, output data processed in the blocker module obtained by active manipulation of an expected output from the input data sent by the at least one user to the AI system, the output data is sent by the blocker module.

BRIEF DESCRIPTION OF THE DRAWINGS

Different modes of the disclosure are disclosed in detail in the description and illustrated in the accompanying drawing.

DETAILED DESCRIPTION

Figure 1:
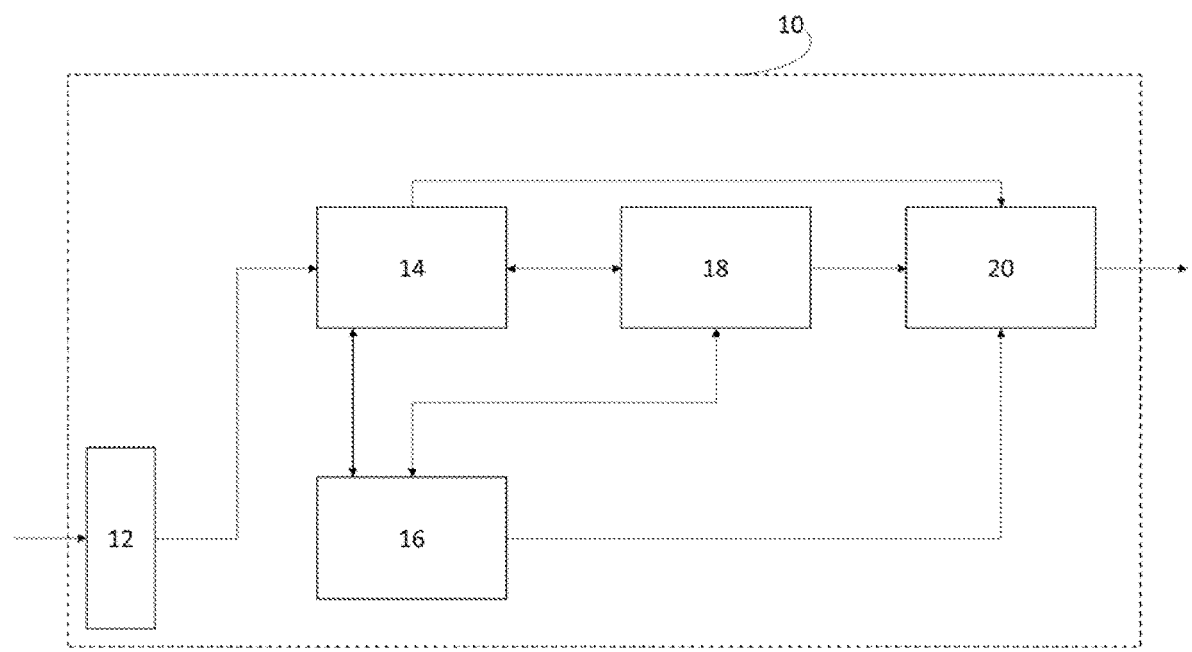
FIG. 1 illustrates a block diagram representative of the different building blocks of an AI system used for preventing capture of an AI module in an AI system.

It is important to understand some aspects of artificial intelligence (AI) technology and artificial intelligence (AI)

based systems or artificial intelligence (AI) system. This disclosure covers two aspects of AI systems. The first aspect is related to the training of a module in the AI system and second aspect is related to the prevention of capturing of the AI module in an AI system.

Some important aspects of the AI technology and AI systems can be explained as follows. Depending on the architecture of the implements AI system may include may components. One such component is an AI module. An AI module with reference to this disclosure can be explained as a component which runs an model. A model can be defined as reference or an inference set of data, which is use different forms of correlation matrices. Using these models and the data from these models, correlations can be established between different types of data to arrive at some logical understanding of the data. A person skilled in the art would be aware of the different types of AI models such as linear regression, naïve bayes classifier, support vector machine, neural networks and the like. It must be understood that this disclosure is not specific to the type of AI model being executed in the AI module and can be applied to any AI module irrespective of the AI model being executed. A person skilled in the art will also appreciate that the AI module may be implemented as a set of software instructions, combination of software and hardware or any combination of the same.

Some of the typical tasks performed by AI systems are classification, clustering, regression etc. Majority of classification tasks depend upon labeled datasets; that is, the data sets are labelled manually in order for a neural network to learn the correlation between labels and data. This is known as supervised learning. Some of the typical applications of classifications are: face recognition, object identification, gesture recognition, voice recognition etc. Clustering or grouping is the detection of similarities in the inputs. The cluster learning techniques do not require labels to detect similarities. Learning without labels is called unsupervised learning. Unlabeled data is the majority of data in the world. One law of machine learning is: the more data an algorithm can train on, the more accurate it will be. Therefore, unsupervised learning models/algorithms has the potential to produce accurate models as training dataset size grows.

As mentioned one aspect of this disclosure relates to the training of the module in the AI system. The specific details of the training methodology will be explained in the later part of this document.

As the AI module forms the core of the AI system, the module needs to be protected against attacks. Attackers attempt to attack the model within the AI module and steal information from the AI module. The attack is initiated through an attack vector. In the computing technology a vector may be defined as a method in which a malicious code/virus data uses to propagate itself such as to infect a computer, a computer system or a computer network. Similarly an attack vector is defined a path or means by which a hacker can gain access to a computer or a network in order to deliver a payload or a malicious outcome. A model stealing attack uses a kind of attack vector that can make a digital twin/replica/copy of an AI module. This attack has been demonstrated in different research papers, where the model was captured/copied/extracted to build a substitute model with similar performance.

The attacker typically generates random queries of the size and shape of the input specifications and starts querying the model with these arbitrary queries. This querying produces input-output pairs for random queries and generates a secondary dataset that is inferred from the pre-trained model. The attacker then take this I/O pairs and trains the new model from scratch using this secondary dataset. This is black box model attack vector where no prior knowledge of original model is required. As the prior information regarding model is available and increasing, attacker moves towards more intelligent attacks. The attacker chooses relevant dataset at his disposal to extract model more efficiently. This is domain intelligence model based attack vector. With these approaches, it is possible to demonstrate model stealing attack across different models and datasets.

As mentioned earlier the second aspect of this disclosure relates to the prevention of capturing of the AI module in an AI system by detecting the attack. This is correlated to the first aspect of this disclosure as the AI module uses a trained model to detect the attack and other component of the AI system are used to prevent the attack.

It must be understood that the disclosure in particular discloses methodology used for training an module in an AI system and a methodology to prevent capturing of an AI module in an AI system. While these methodologies describes only a series of steps to accomplish the objectives, these methodologies are implemented in AI system, which may be a combination of hardware, software and a combination thereof.

Figure 2:
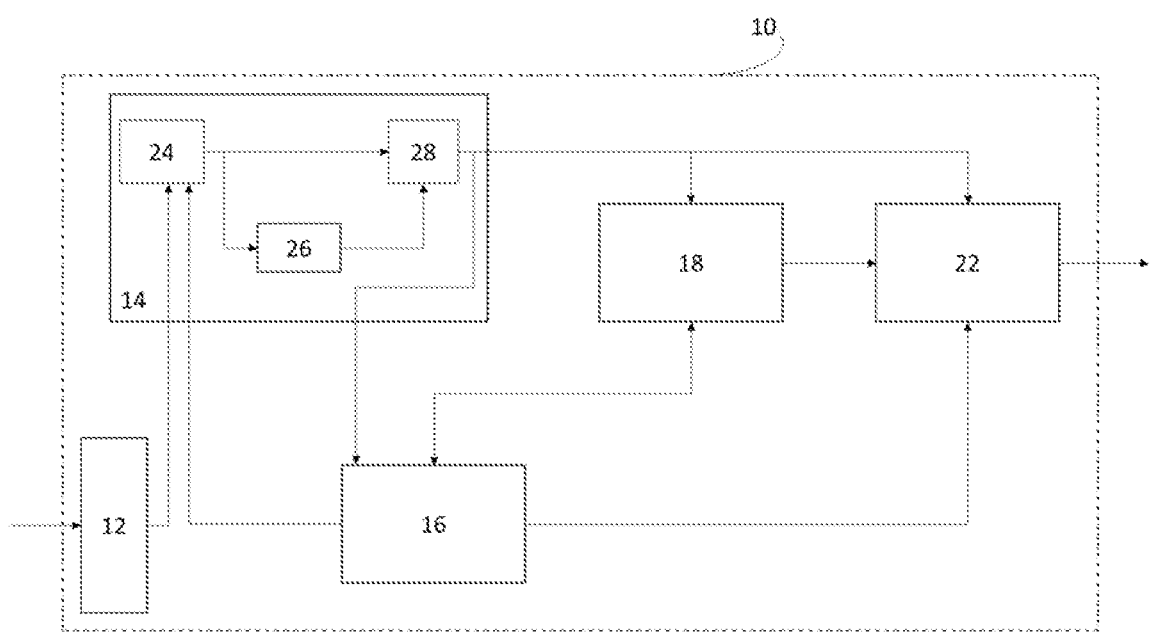
FIG. 2 illustrates a block diagram representative of the different building blocks of an AI system with additional details, used for preventing capture of an AI module in an AI system.

FIG. 1 and FIG. 2 illustrate a block diagrams representative of the different building blocks of an AI system in accordance with this disclosure. It must be understood that each of the building blocks of the AI system may be implemented in different architectural frameworks depending on the applications. In one embodiment of the architectural framework all the building block of the AI system are implemented in hardware i.e. each building block may be hardcoded onto a microprocessor chip. This is particularly possible when the building blocks are physically distributed over a network, where each building block is on individual computer system across the network. In another embodiment of the architectural framework of the AI system are implemented as a combination of hardware and software i.e. some building blocks are hardcoded onto a microprocessor chip while other building block are implemented in a software which may either reside in a microprocessor chip or on the cloud.

As seen in FIG. 1, the AI system 10 comprising at least: an input interface 12 to receive input data from at least one user; a blocker module 14 to detect the received input data is an attack input data and to manipulate output data of the blocker module 14 and sending the output data from the blocker module to the at least one user; an AI module 16 to process the input data received by the blocker module 14 and generate output data corresponding to the input data; a blocker notification module 18 to transmit a notification to the owner of the AI system 10 on detecting an attack input data; and an output interface 20 to send the generated output data to the at least one user.

As mentioned earlier FIG. 2 provides additional details with reference to the blocker module itself. The blocker module 14 comprises a module 24 adapted to be trained in a manner such as to detect the output of an attack input data and detect the output of a valid input data, the module (24) receives input data from the at least one user through the input interface 12; a classifier module 26 adapted receive output from the module 24 and classify the distribution of the output data of the attack input data and output of the valid input data; and a comparator module 28 adapted to compare the classified distribution received from the classifier module 26 with the output of the trained module/module 24 and send an output to the at least one user, the output generated in manner such that the probability of the occurrence of that output is low for that input.

Figure 3:
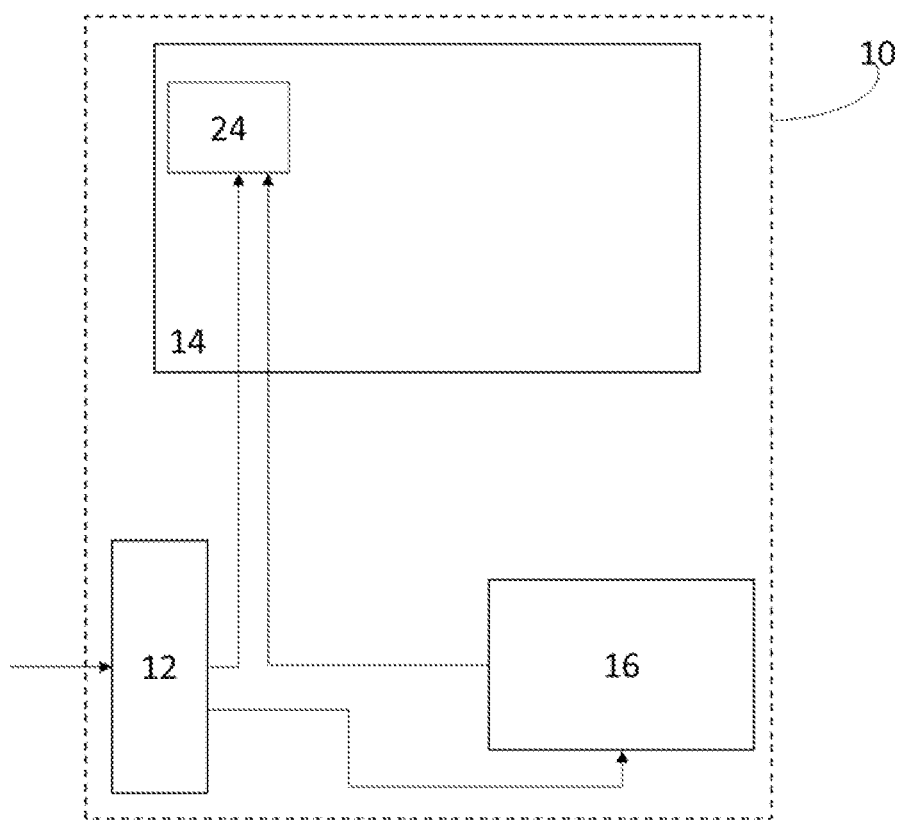
FIG. 3 illustrates a block diagram representative of the different building blocks of the an AI system for training a module in the blocker module of the AI system.
Figure 4:
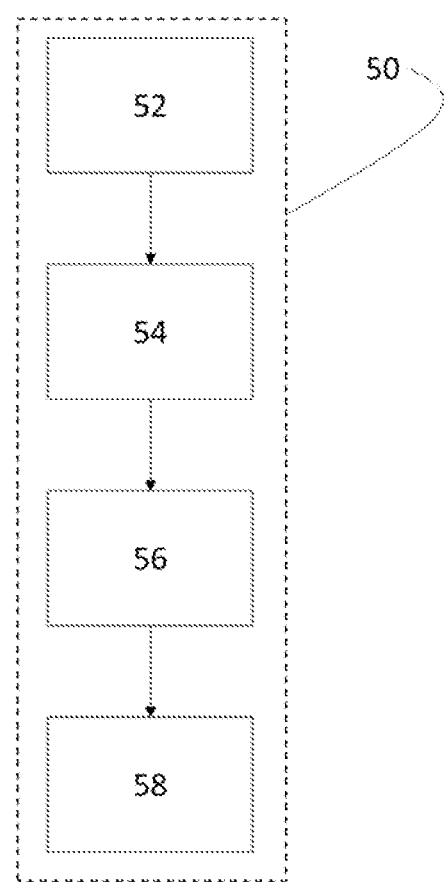
FIG. 4 is a block diagram representing the method of training a module in the blocker module in the AI system.

FIG. 3 illustrates a block diagram representative of the different building blocks of the AI system for training a module in the blocker module of the AI system. For training of the module 24 in the blocker module 14, the input data from the input interface 14 is sent to the module 24. The module 24 also receives an input from the AI module 16. The input data is received through an input interface, in the training scenario the input interface is a hardware interface that is connected to the AI module 16 and to the module 24 via a wired connection or a wireless connection. During training of the module 24 a set of information or dataset would be required. In one embodiment the module 24 and the AI module 16 are implemented as hardware components. The module 16 would comprise a processor component, which also has a storage medium. The dataset is a storage medium. The AI module 16 comprises a processor component, which also has a storage medium. As seen in FIG. 3, the input data is received by the AI module 16. The AI module communicates with the module 24. The input data provided to the AI module 14 may be a combination of inputs, which triggers an expected output from the AI module 14. Since the training methodology used here is an unsupervised training methodology, no further labelling of the data is to be done. The method of training the module 24 is illustrated using a block diagram in FIG. 4. The method 50 of training the module 24 in a blocker module 14 in an AI system 10 comprises the following steps: searching (52) for all available attack input data and valid input data; recording (54) output for all available attack input data; recording (56) output for all available valid input data; and providing a distribution (58) of the recorded output for the attack input data and recorded output for the valid input data. Post recording output (54), (56) and providing a distribution (58), the module (24) is a trained module (24).

Attack vectors are random queries, which are received by the AI module 16. Since attack vectors or bad data is random and the number of attack vectors cannot be controlled. The output behavior of the AI module 14 is sent to module 16 and recorded in the module 16. Post recording of the internal behavior of the AI module 14, the module 16 is a trained module 16. The trained module 16 is trained using the unsupervised learning methodology as mentioned in the earlier text. The information from the trained module 16 is also stored in the dataset 24 for further use. Thus the module 16 is trained in a manner such that the information related to the expected output behavior of the AI module 14 is recorded and is considered as normal behavior of the AI module to an input.

As mentioned earlier based on the architectural framework of the AI system depends on the implementing application. The building blocks of the AI system 10 may be implemented in different architectural frameworks depending on the applications. In one embodiment of the architectural framework all the building block of the AI system are implemented in hardware i.e. each building block may be hardcoded onto a microprocessor chip. This is particularly possible when the building blocks are physically distributed over a network, where each building block is on individual computer system across the network. In another embodiment of the architectural framework of the AI system are implemented as a combination of hardware and software i.e. some building blocks are hardcoded onto a microprocessor chip while other building block are implemented in a software which may either reside in a microprocessor chip or on the cloud. Each building block of the AI system in one embodiment would have a individual processor and a memory.

Figure 5:
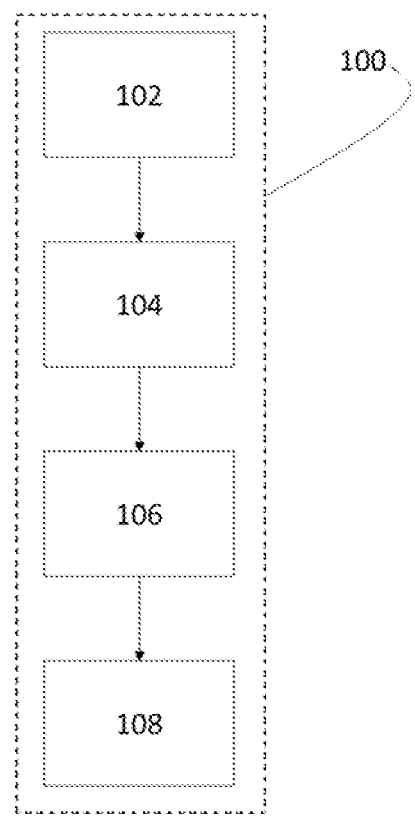
FIG. 5 is a block diagram representing the method of preventing capture of the AI module in the AI system.

FIG. 5 is a block diagram representing the method of preventing capture of the AI module in the AI system. The method 100 to prevent capturing of an AI module 16 in an AI system 10, the method 100 comprises the following steps: receiving 102 input data from at least one user through an input interface 12 identifying 104 the input data as an attack input data or as valid input data in a blocker module 14; processing 106 the input data based on the identification 104 and input from a trained module/module 24 in the blocker module 14; sending 108 through the blocker module 14 to the at least one user the output data processed in the blocker module 14 obtained by active manipulation of the expected output from the input data sent by the at least one user to the AI system 10. The output data is sent by the blocker module 14.

While identifying 104 the input data as attack data or as valid input data, input data is transmitted from the input interface 12 to the module 24 of the blocker module 14. The module/trained module 24 of the blocker module 14 has output data related to all known attack input data and valid input data. At least a part of the processing 106 is implemented in the classifier module 26 of the blocker module 14, the classifier module 26 is adapted to classify the distribution of the output data of the attack input data and output of the valid input data.

At least a part of the processing 106 is implemented in the comparator module 28 of the blocker module 14, the comparator module 28 actively manipulates output data sent to the user in a manner such that the comparator module 28 compares the classified distribution received from the classifier module 28 with the output of the trained module 24 and sends an output to the at least one user. The output generated in manner such that the probability of the occurrence of that output is low for that input. On identification 104 of input data as an attack input data in the blocker module 14, a blocker notification module 18 transmits a notification of the attack input data to the owner of the AI system 10.

During runtime and during the working of the AI system 10 in accordance with this disclosure, the AI system may receive an input through the input interface 11. The input is received by the AI module 14. Irrespective of whether input is good data or bad data (attack vector), the AI module gives a certain output. The principle of the methodology of training the module 24 and the method of preventing capture of the AI module 16 is that the initial training for detection of attack is done through original data and known attack vectors, which will make it very difficult to defend against the novice attack vector. There is the chance of being an attack against the novice attack vector but as the module 24 to detect the attack vector is trained on the probability values of the previously found attack vectors so it will increase the chances of detection of the new attack vector. As the distribution of the output value of the attack vector over the actual data is different and so we can detect the new attack vector more efficiently. Post detection of the attack vector, rather than blocking output, we send out manipulated output. In accordance with one methodology, the manipulated output is selected as the lowest probability value class, which is the total opposite of the original prediction. Hence attacker will receive the wrong output and will not be in a position to train models with reasonable accuracy.

Thus the advantage of this type of a method and AI system is that a user who sends an invalid input would still receive an output from the AI system 10. However, using the output data from the AI system 10 it would be very difficult to reconstruct/recreate the AI module 16. Hence stealing the AI model in the AI module would be difficult or minimized. Beyond the possibility of providing an output that is generated by the blocker module 14 it is also possible to flag the user using the AI system in accordance with this disclosure. Flagging of the user would be based on the user profile. The following information may be used to store information regarding the user: types of the bad data/attack vectors provided by the user, number of times the user input bad data/attack vector, the time of the day when bad data/attack vector was inputted to the AI system, the physical location of the user, the digital location of user, the demographic information of the user and the like. In addition the user profile may be used to determine whether the user is habitual attacker or was it one time attack or was it only incidental attack etc. Depending upon the user profile, the steps for unlocking of the system may be determined. If it was first time attacker, the user may be locked out temporarily. If the attacker is habitual attacker then a stricter locking steps may be suggested.

It must be understood that the AI system as disclosed through the representation shown in FIG. 1 and FIG. 2 are only illustrative and do not limit the scope of the disclosure from the perspective of the location of the various building blocks of the AI system 10. It is envisaged the position of the building blocks of the AI system can be changed and these are within the scope of this disclosure. The scope of this disclosure is only limited from the perspective of the method steps as disclosed. The implementation of the each of the building blocks of the AI system 10 can be done in any form which may be hardware, software or a combination of hardware and software

What is claimed is:

1. An AI system comprising (i) an input interface configured to receive input data from at least one user, (ii) an AI module configured to process said received input data, and to generate output data corresponding to said processed input data, and (iii) an output interface configured to send said generated output data from the AI module to the at least one user, the AI system further comprising:
    a blocker module configured (i) to detect said received input data is an attack input data, (ii) to manipulate output data of said blocker module, and (iii) to send said manipulated output data from said blocker module to the at least one user; and
    a blocker notification module configured to transmit a notification to an owner of said AI system when said attack input data is detected.

2. The AI system as claimed in claim 1, said blocker module comprising:
    a module configured to be trained to detect when said generated output data corresponds to said attack input data and to detect when said generated output data corresponds to valid input data, said module configured to receive said input data from said at least one user through said input interface;
    a classifier module configured to receive an output from said module and to classify a distribution of said output data of said attack input data and said output of said valid input data; and
    a comparator module configured to compare said classified distribution received from said classifier module with said output of said trained module/module and to send an output to the at least one user, said output generated such that a probability of an occurrence of that output is low for said input.

3. A method to prevent capturing of an AI module in an AI system, the method comprising:
    receiving input data from at least one user through an input interface;
    identifying said input data as attack input data or as valid input data in a blocker module;
    processing said input data based on said identification and input from a trained module/module in said blocker module; and
    sending through said blocker module to the at least one user, output data processed in said blocker module obtained by active manipulation of an expected output from said input data sent by the at least one user to said AI system, said output data is sent by said blocker module.

4. The method as claimed in claim 3, wherein when identifying said input data as the attack data or as the valid input data, said received input data is transmitted from said input interface to said trained module/module of said blocker module.

5. The method as claimed in claim 3, wherein said trained module/module of said blocker module has output data based on known attack input data and valid input data.

6. The method as claimed in claim 3, wherein:
    at least a part of said processing is implemented in a classifier module of said blocker module, and
    said classifier module classifies a distribution of the output data of said attack input data and output of said valid input data.

7. The method as claimed in claim 3, wherein:
    at least a part of said processing is implemented in a comparator module of said blocker module,
    said comparator module actively manipulates output data sent to the at least one user such that said comparator module compares the classified distribution received from said classifier module with the output of said trained module/module and sends an output to said at least one user, and
    said output is generated such that a probability of an occurrence of that output is low for said input.

8. The method as claimed in claim 3, wherein when said input data is identified as the attack input data in said blocker module, a blocker notification module transmits a notification of the attack input data to an owner of the AI system.

* * * * *